(12) United States Patent
Wüllrich

(10) Patent No.: US 11,691,487 B2
(45) Date of Patent: Jul. 4, 2023

(54) TOP FOR A CONVERTIBLE VEHICLE, THE TOP COMPRISING A HEADLINER ASSEMBLY

(71) Applicant: Webasto SE, Stockdorf (DE)

(72) Inventor: Heinrich Wüllrich, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 80 days.

(21) Appl. No.: 17/348,130

(22) Filed: Jun. 15, 2021

(65) Prior Publication Data
US 2021/0394597 A1 Dec. 23, 2021

(30) Foreign Application Priority Data

Jun. 18, 2020 (DE) ...................... 10 2020 116 117.4

(51) Int. Cl.
*B60J 7/12* (2006.01)
*B60J 7/00* (2006.01)

(52) U.S. Cl.
CPC ........... *B60J 7/1282* (2013.01); *B60J 7/0023* (2013.01); *B60J 7/1247* (2013.01); *B60J 7/1239* (2013.01); *B60J 7/1243* (2013.01)

(58) Field of Classification Search
CPC ...... B60J 7/1226; B60J 7/1282; B60J 7/1247; B60J 7/1239; B60J 7/0023; B60J 7/1243; B60J 7/1204
USPC .................. 296/107.01, 107.12, 107.06, 108
See application file for complete search history.

(56) References Cited

U.S. PATENT DOCUMENTS

| 4,991,902 A * | 2/1991 | Schrader ................ B60J 7/1226 296/108 |
| 6,902,223 B2 * | 6/2005 | Hollenbeck ............ B60J 7/1204 296/117 |
| 9,004,573 B2 * | 4/2015 | Haberl ................... B60J 7/1265 296/108 |
| 10,449,842 B2 | 10/2019 | Haimerl |
| 10,730,374 B2 * | 8/2020 | Wüllrich ................. B60J 7/1252 |
| 2008/0074895 A1 | 3/2008 | Halbweiss et al. |
| 2016/0221425 A1 * | 8/2016 | Haberl ................... B60J 7/0573 |

FOREIGN PATENT DOCUMENTS

| DE | 102006044911 A1 | 3/2008 |
| DE | 102017102058 A1 | 8/2018 |

* cited by examiner

*Primary Examiner* — Joseph D. Pape
*Assistant Examiner* — Veronica M Shull
(74) *Attorney, Agent, or Firm* — Fitch, Even, Tabin & Flannery, LLP

(57) ABSTRACT

A top for a convertible vehicle having a foldable top cover and a top linkage for deploying the top cover, the top linkage being displaceable between a closed position and a storage position, the top linkage having a link assembly on either side of the top, each link assembly being pivotably mounted on a vehicle-attached main bearing and having a tension rod assembly hinged to a tension bow which extends between the bilaterally disposed link assemblies and limits the top cover at its rear edge in the closed position, and the top having a headliner assembly having a foldable headliner fabric and forming an inner visible surface of the top in the closed position. The headliner assembly may have a guide link on either side of the top, each guide link being hinged to the respective tension rod assembly, and the headliner fabric being in contact with each guide link.

13 Claims, 10 Drawing Sheets

TOP FOR A CONVERTIBLE VEHICLE, THE TOP COMPRISING A HEADLINER ASSEMBLY

CROSS-REFERENCE TO RELATED APPLICATION

This application claims priority from German Patent Application Number DE 10 2020 116 117.4, filed Jun. 18, 2020, which is hereby incorporated herein by reference in its entirety for all purposes.

FIELD

The invention relates to a top for a convertible vehicle, the top having the features of the preamble of claim 1.

BACKGROUND

A top of this kind is known from practice and is a displaceable convertible roof which can be displaced between a closed position, in which a vehicle interior is covered, and a storage position, in which the vehicle interior is uncovered and in which the top is disposed in a rear top storage space of the vehicle in question. For being displaced, the top comprises a top linkage having a link assembly on either side of a vertical longitudinal center plane of the top, each link assembly being pivotably mounted on a respective main bearing attached to the vehicle. A foldable top cover can be deployed by means of the top linkage, said top cover forming a weather-proof outer skin of the top. At its edge disposed at the rear relative to the closed position of the top, the top cover is limited by a rear tension bow extending between the bilaterally disposed link assemblies. The tension bow is pivotable and is connected to a tension rod assembly on either side for this purpose, each tension rod assembly being connected to a respective drive link.

Additionally, the known top comprises a headliner assembly comprising a foldable, deployable headliner fabric forming an inner visible surface of the top when the top is in the closed position. The headliner fabric can be connected to panel elements that predetermine its curve or shape. The panel elements can be realized as flaps which pivot when the top is being displaced so as to clear a space for movement of main links of the link assemblies. However, there may be the issue that the headliner fabric does not have enough distance from other links of the respective link assembly in the area of the main bearings, causing them to be outlined in the visible surface formed by the headliner fabric.

SUMMARY

The object of the invention is to provide a top of the kind mentioned above in which optimized guiding of a headliner fabric of a headliner assembly is ensured even in critical areas.

According to the invention, this object is attained by the top having the features of claim 1.

So the headliner assembly of the top according to the invention is provided with a guide link on either side, each guide link being hinged to the respective tension rod assembly, and the headliner fabric being in contact with each guide link. When the top is in the closed position, the guide links can each ensure that the headliner fabric has enough distance from other top components, in particular from other links of the top linkage, so that they cannot be outlined in the headliner fabric. So the guide links predetermine a defined position of the headliner fabric when the top is in the closed position. During the displacement of the top, the guide links ensure that the headliner fabric does not enter the trajectory of a link of the top linkage and might get caught, which could even lead to failure of the top. The guide links can be integrated into the top linkage without requiring a large amount of installation space.

In a specific embodiment of the top according to the invention, the guide link comprises a contact plate with which the headliner fabric is in contact and to which the headliner fabric is in particular fixed. The contact plate ensures that the headliner fabric has a harmonic curve in the area of the guide link, which, in turn, leads to an optically pleasing appearance of the top on its inside.

In a preferred embodiment of the top according to the invention, the guide link, with which the headliner fabric is in contact, is connected to an actuation means. During the displacement of the top, the actuation means introduces a displacing moment into the guide link, causing it to be pivoted relative to the tension rod assembly.

The actuation means, by means of which the guide link can be pivoted, comprises a pull cable, for example, which is attached to the guide link on one side and to an adjusting link of the respective link assembly on the other side. By means of the pull cable, a pulling force is introduced into the guide link in particular during the displacement of the top into its closed position, whereby the guide link is moved into a pivoted position associated with the closed position of the top. During the displacement of the top into its open position, the pulling moment exerted by the pull cable is released. The guide link then follows the movement displacing the headliner into the storage position.

Basically any link of the respective link assembly can be used as the adjusting link for the pull cable. In a specific embodiment of the top according to the invention, however, the adjusting link is formed by a lowering lever for the tension bow, which lowers the tension bow relative to the main bearing with its pivoting axis during the displacement of the top into the closed position.

In a preferred embodiment of the top according to the invention, in order to define the pivoted position of the guide links when the top is in the closed position, the guide links each interact with a stop determining the pivoted position relative to the respective tension rod assembly when the top is in the closed position. The stop is formed at a protrusion of the respective guide link, for example. During the pivoting of the guide link into its end position, the stop preferably strikes the tension rod assembly.

The bilaterally disposed tension rod assemblies preferably each comprise two tension rods which are hinged to each other and one of which is disposed at the rear when the top is in the closed position and is hinged to the tension bow and the other one is disposed at the front and is hinged to another link of the respective link assembly. The tension rod assembly is provided with an actuation means, which can be formed by a link of the respective link assembly or by an adjustment cylinder.

The two link assemblies of the top linkage typically each comprise a main multi-joint linkage having two main links which are pivotably mounted on the respective main bearing and one of which forms what is referred to as a main pillar, on which a side weatherstrip of the top is disposed. In a specific embodiment of the top according to the invention, a guide flap for the headliner fabric is pivotably mounted on the main multi-joint linkage. When the top is actuated, the guide flap under-goes a displacement between a cover position, in which the guide flap covers at least part of the main multi-joint linkage, and an open position, which is associated with the storage position of the top linkage and in which the main multi-joint linkage can be pivoted freely without the guide flap being disposed in the trajectory. In any event, the guide flap forms a guiding element with which the headliner fabric is in contact and to which the headliner fabric is in particular attached.

In a preferred embodiment of the top according to the invention, the guide flaps are each provided with an actuating member, which in particular comprises a pull cable but can additionally or alternatively also have a coupling rod, for pivoting the guide flaps between the cover position and the open position. One end of the pull cable is connected to the guide flap or to a bearing link to which the guide flap is attached. The other end of the pull cable is preferably connected to another link of the respective link assembly. The pull cable exerts a pulling force on the guide flap in particular when the top is being displaced into its closed position, causing the guide flap to be pulled into the cover position.

In order for the guide flap to be able to also be displaced into a second end position, an adjusting spring pre-loading the guide flap in the direction of said end position is preferably provided, the actuating member pivoting the guide flap against the spring force of said adjusting spring.

The guide flap also predetermines the shape or the curve of the headliner fabric. In particular, the guide flap has an edge which follows a curve of a side weatherstrip when the top is in the closed position, said side weatherstrip laterally limiting the top cover and preferably being disposed on one of the main links, in particular the main pillar.

The headliner fabric preferably fully covers the guide flap. Thus, in the area of the guide flap, the headliner fabric has a curve corresponding to the shape of a contact surface of the guide flap.

The invention also relates to a convertible vehicle comprising a top of the kind described above.

Other advantages and advantageous configurations of the subject matter of the invention are apparent from the description, the drawing and the claims.

An embodiment example of a top according to the invention is illustrated in the drawing in a schematically simplified manner and will be explained in more detail in the following description.

BRIEF DESCRIPTIONS OF THE DRAWINGS

DETAILED DESCRIPTION

Figure 1:
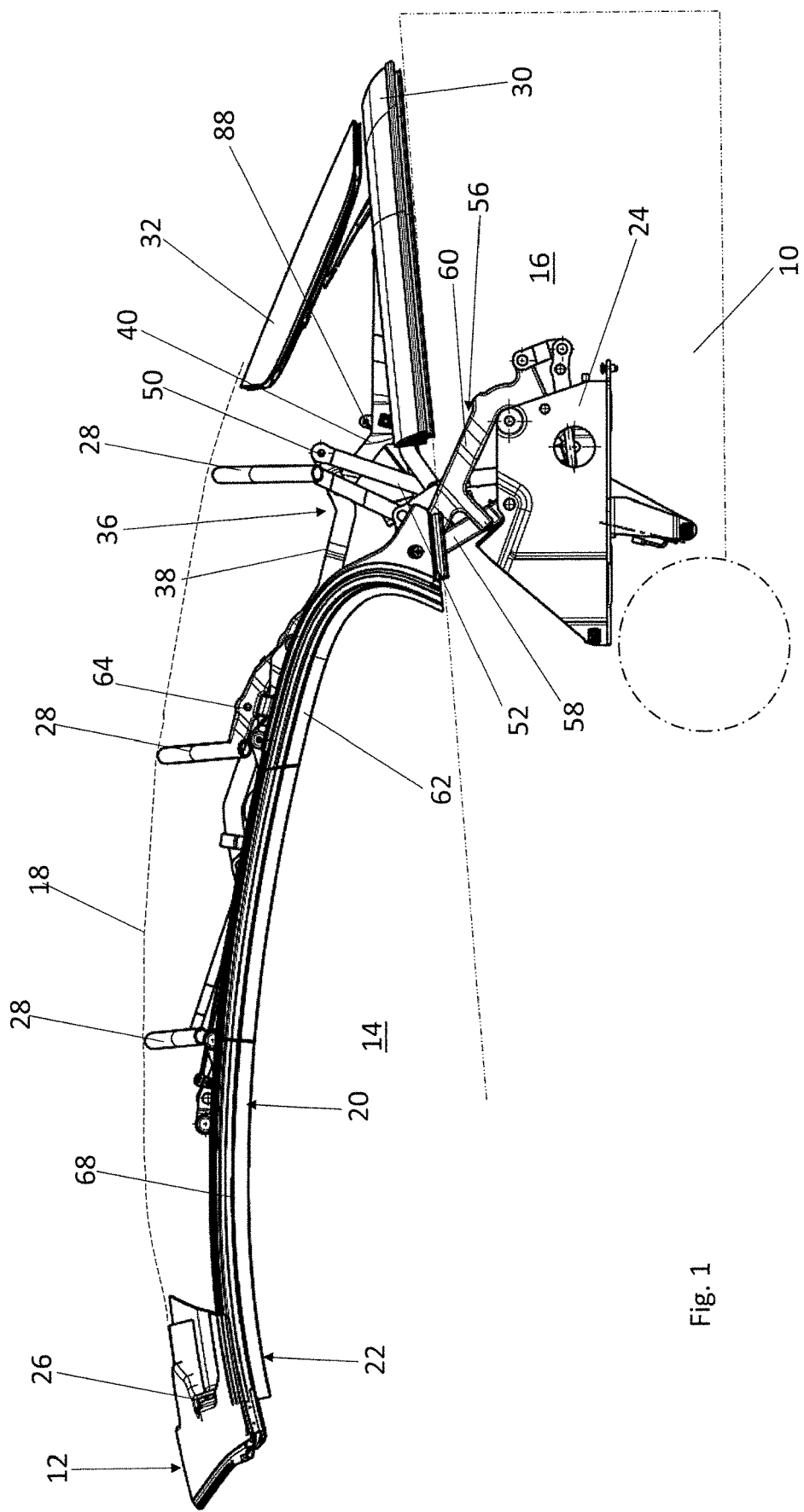
FIG. 1 is a schematic side view of a motor vehicle having a top according to the invention.
Figure 2:
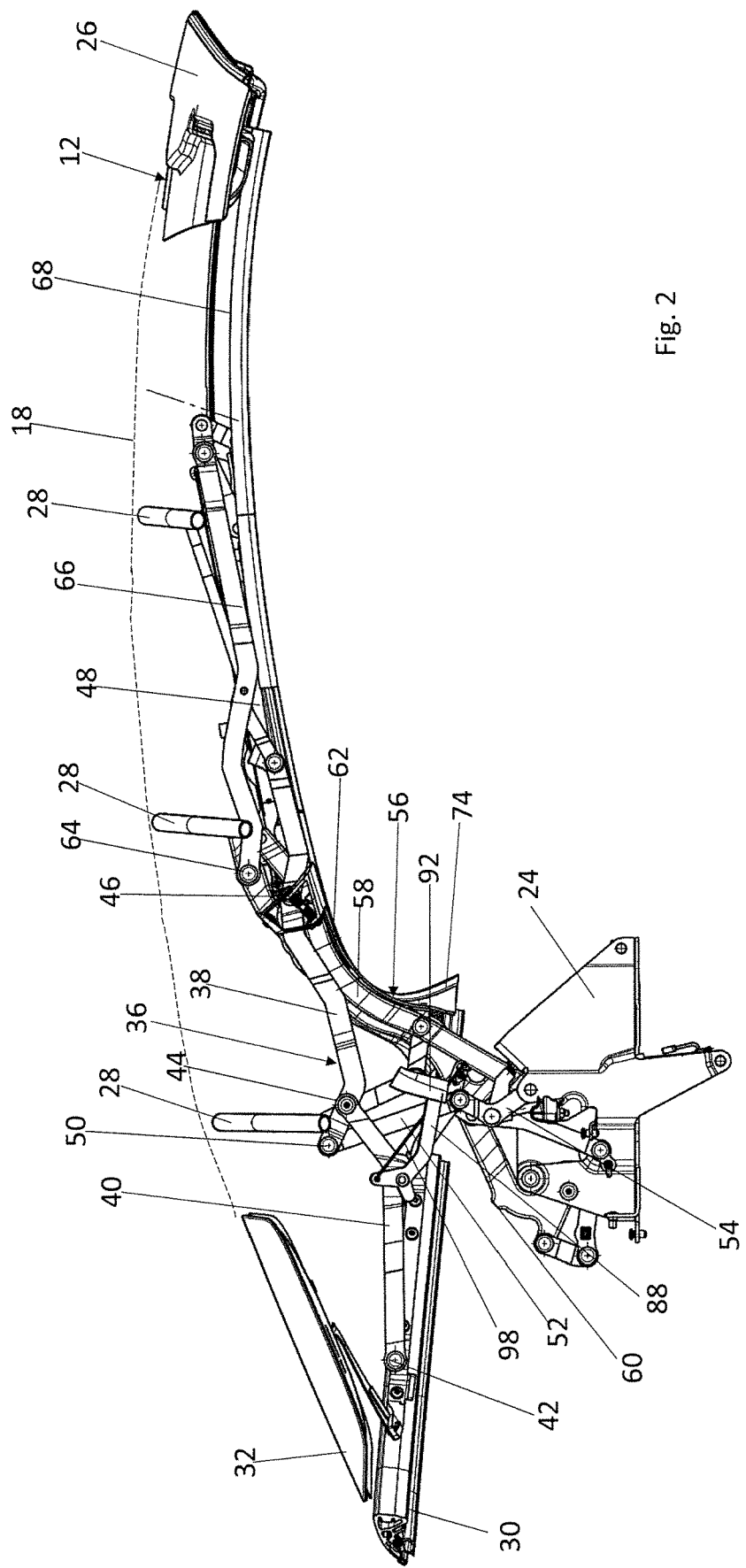
FIG. 2 is a schematic interior view of a top linkage of the top.
Figure 3:
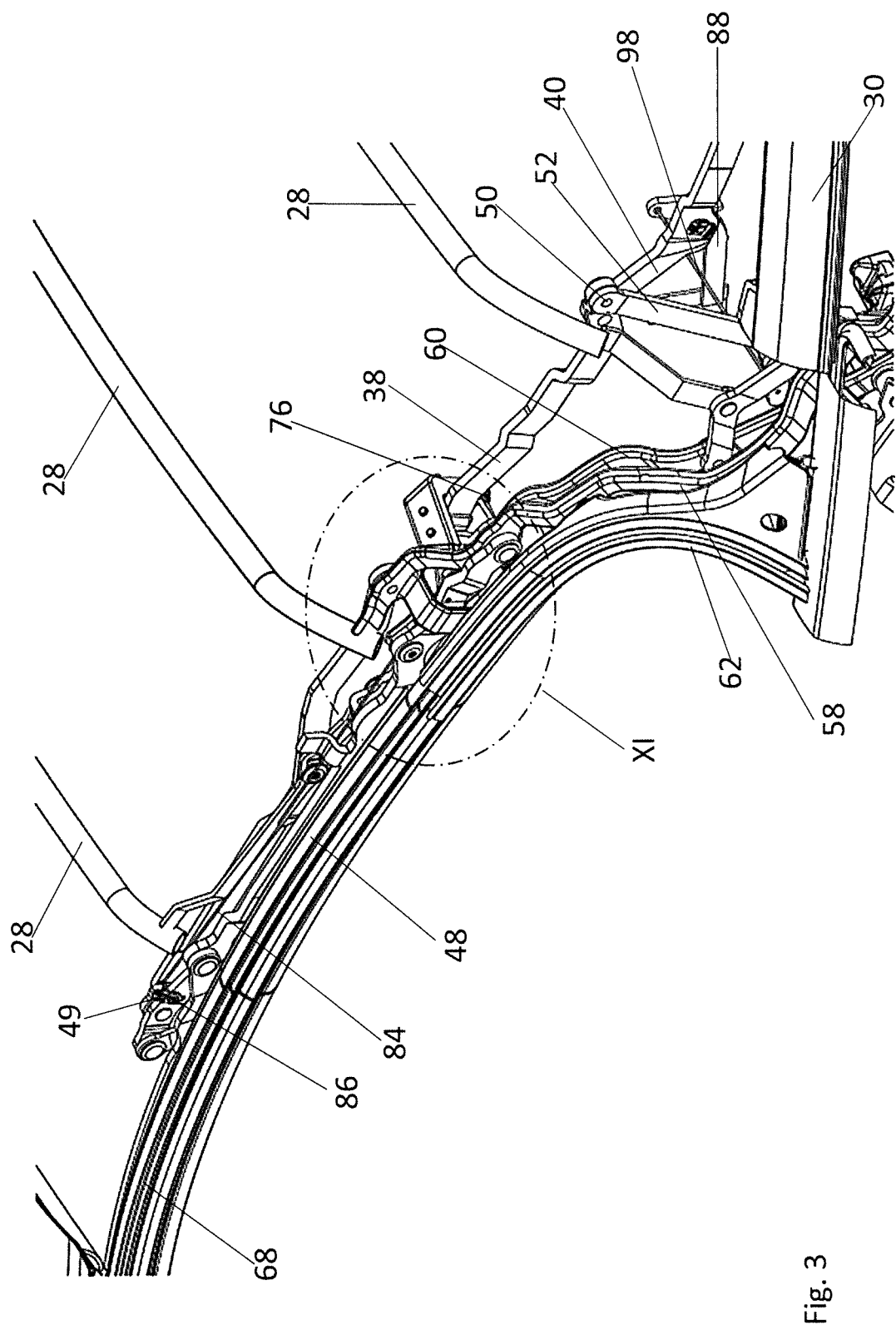
FIG. 3 is a perspective partial exterior view of the top linkage.

The drawing illustrates a motor vehicle 10 realized as what is known as a convertible vehicle and comprising a displaceable top 12 displaceable between a closed position, in which a vehicle interior 14 is covered, and a storage position, in which vehicle interior 14 is uncovered and top 12 is accommodated in a rear top storage space 16 of motor vehicle 10.

Top 12 comprises a foldable top cover 18, which is illustrated by a dashed line in FIG. 1 and forms a weatherproof outer skin of top 12. For deploying top cover 18, top 12 comprises a top linkage 20, which comprises a link assembly 22 on either side of a vertical longitudinal center plane of top 12, each link assembly 22 being pivotably mounted on a main bearing 24 attached to the body.

Bilaterally disposed link assemblies 22 are essentially mirror-symmetrical with respect to the vertical longitudinal center plane of top 12. Hence, reference will largely be made to the link assembly 22 disposed on the left with respect to the forward direction of travel of the motor vehicle. The link assembly disposed on the right with respect to the forward direction of travel is analogously apparent.

A front bow 26 and multiple transverse bows 28, which are realized as tubular bows in the case at hand, extend between bilaterally disposed link assemblies 22. A tension bow 30, which limits top cover 18 at its rear edge when top 12 is in the closed position, extends between the two link assemblies 22 at the rear. A rear window 32, which is disposed in a cutout of top cover 18, is mounted on tension bow 30.

At each of its bilaterally disposed ends, tension bow 30 is pivotably mounted on a lowering lever 34, which itself is pivotably mounted on main bearing 24. By means of bilaterally disposed lowering levers 34, tension bow 30 is lowered relative to main bearings 24 when top 12 is being displaced from the closed position into the storage position.

Figure 5:
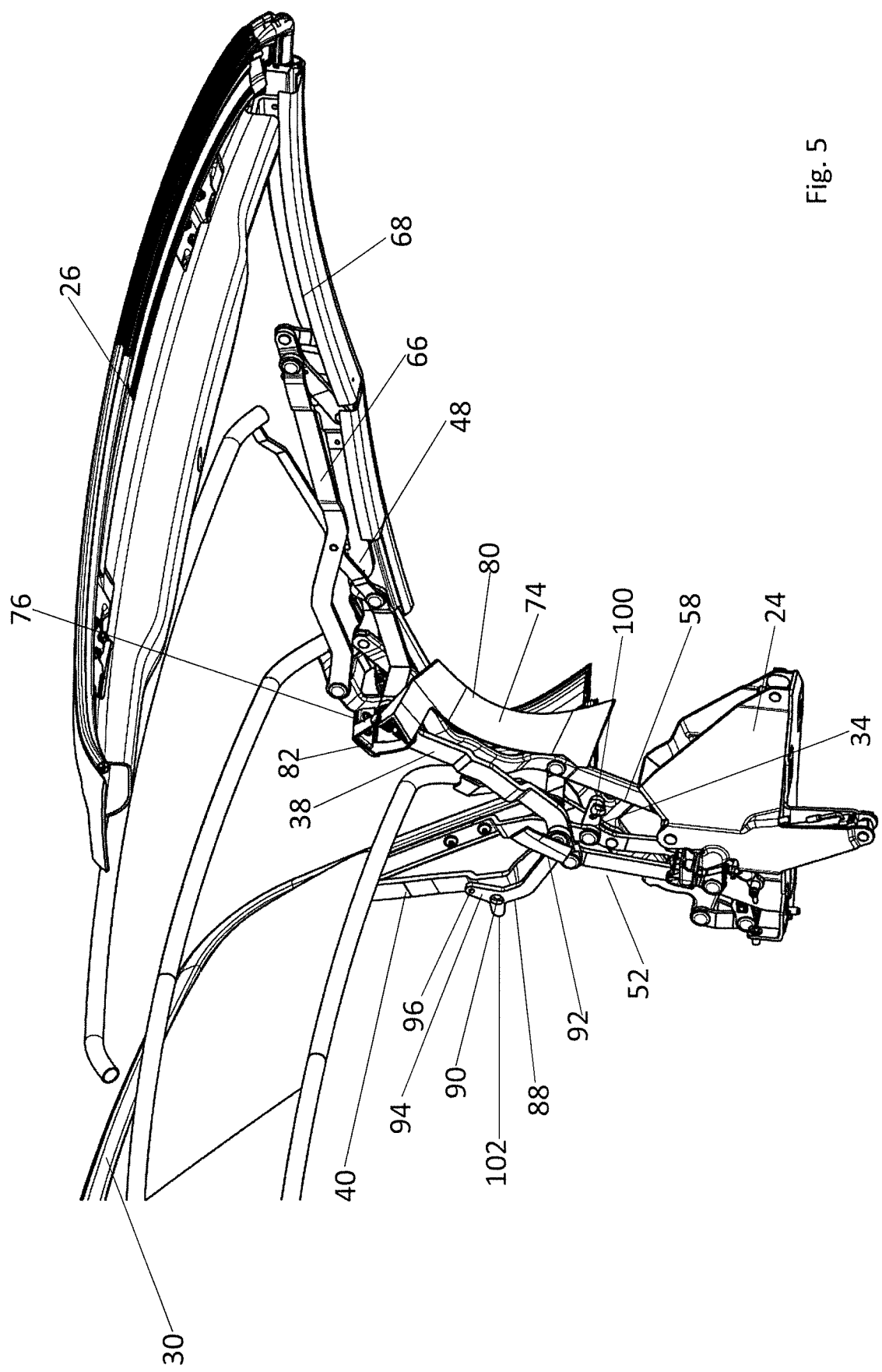
FIG. 5 is a perspective partial interior view of an intermediate position during the displacement of the top.
Figure 6:
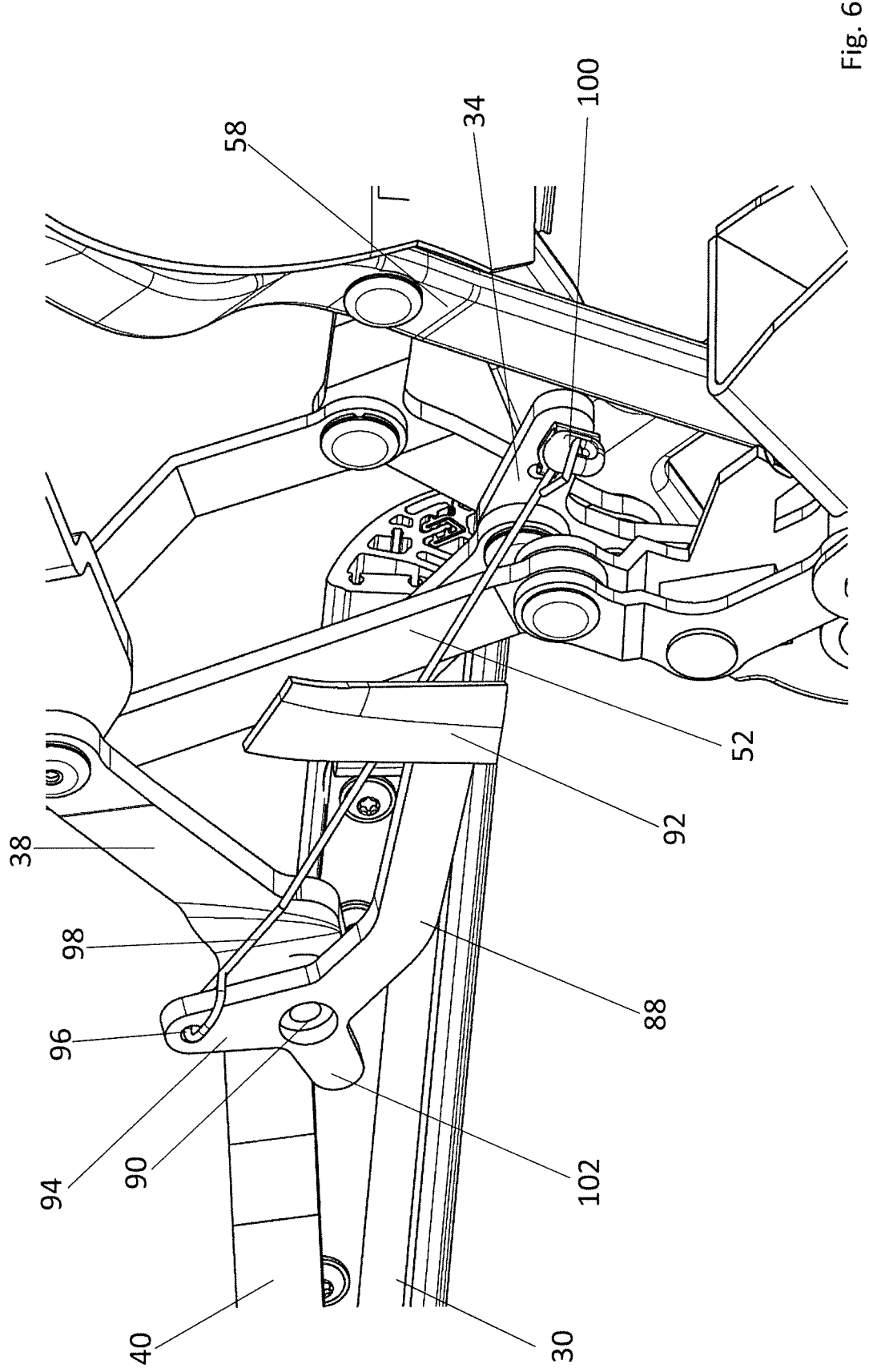
FIG. 6 is an enlarged illustration of area VI in FIG. 4.
Figure 7:
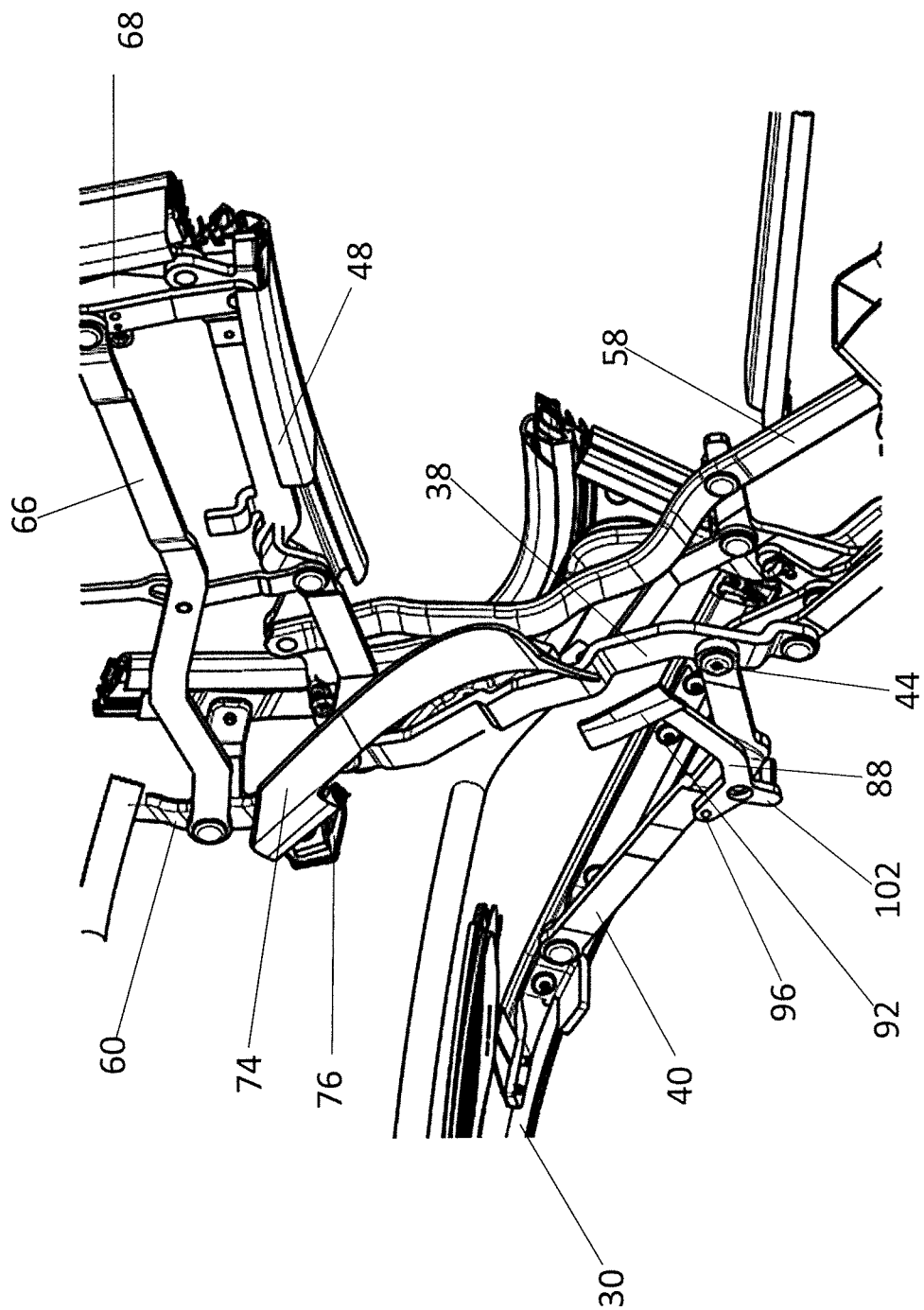
FIG. 7 is a view essentially corresponding to FIG. 6, but during the displacement of the top into the storage position.
Figure 8:
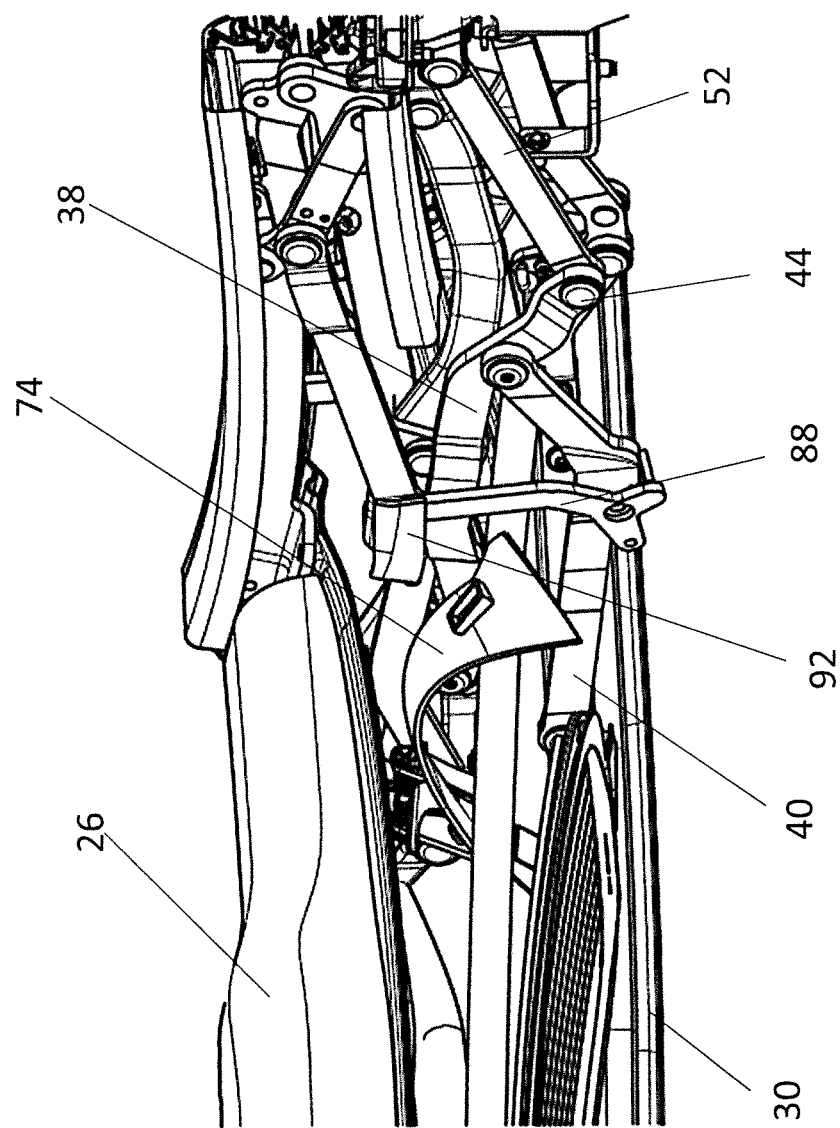
FIG. 8 is a view also essentially corresponding to FIG. 6, but in the storage position of the top.
Figure 10:
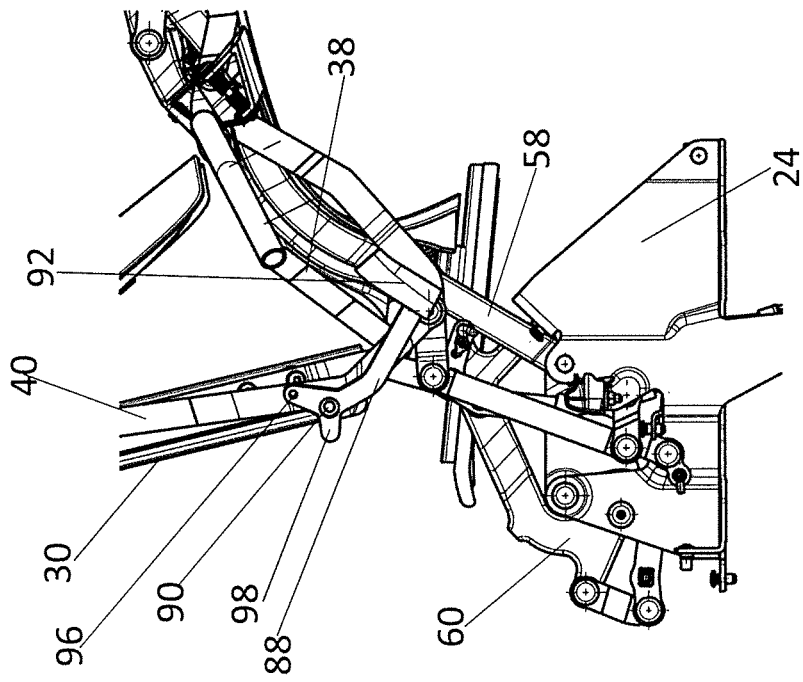
FIG. 10 is a view corresponding to FIG. 9, but with a tension bow raised.
Figure 9:
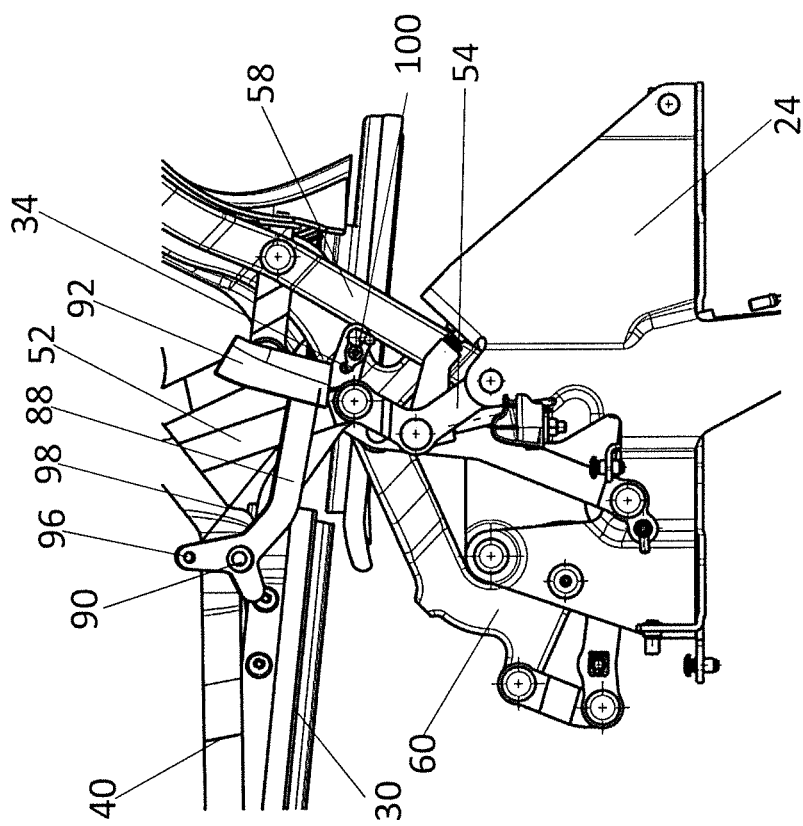
FIG. 9 is an enlarged view of area IX in FIG. 2.
Figure 11:
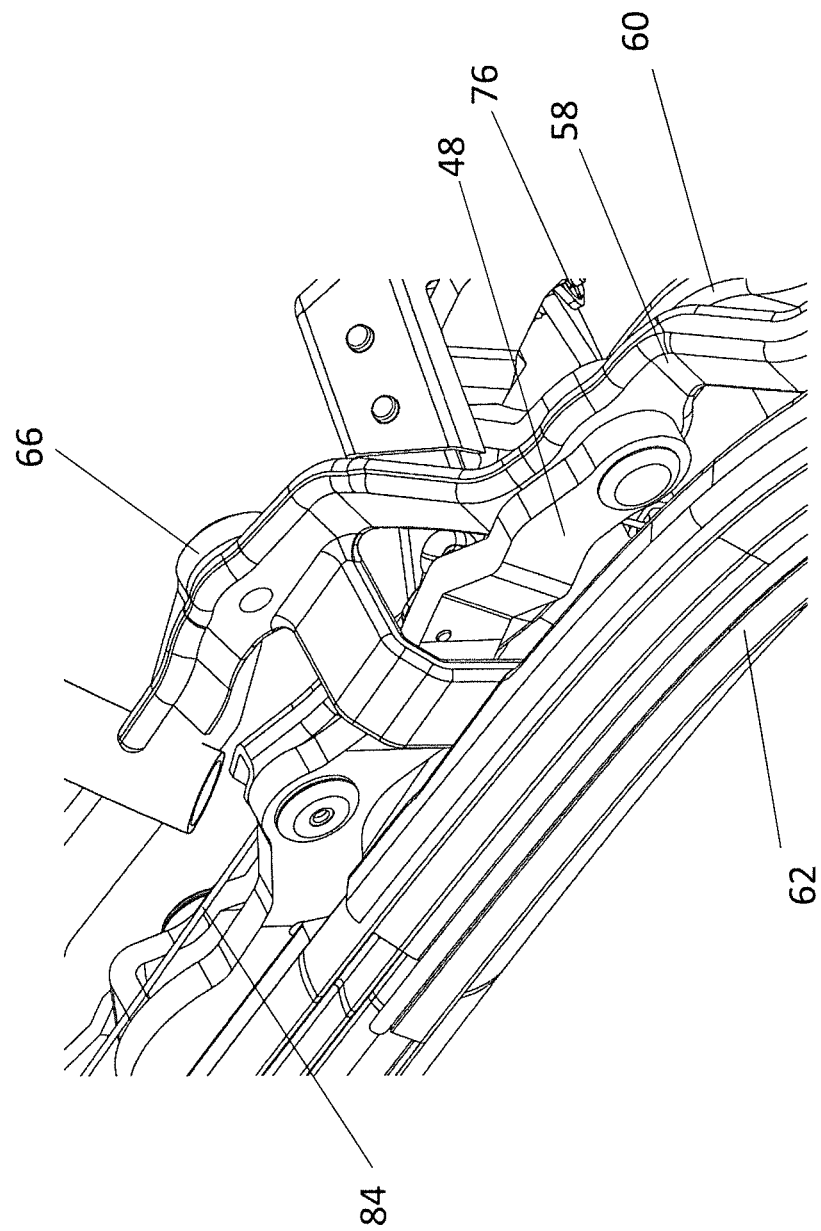
FIG. 11 is an enlarged illustration of area XI in FIG. 3.

In order to be able to move tension bow 30 from the closed position of top 12 into a raised position illustrated in FIG. 5, in which a rear top box lid of top storage space 16 can be displaced between an open position and a closed position, link assemblies 22 each have a tension rod assembly 36, which comprises a front tension rod 38 and a rear tension rod 40. Rear tension rod 40 is hinged to tension bow 30 via a hinge point 42 and connected to front tension rod 38 via a hinge point 44. At its end located in front when top 12 is in the closed position, front tension rod 38 is connected to a middle roof link 48 via a hinge point 46. For actuating tension rod assembly 36, a drive link 52, which can be actuated via a coupling link 54, which is pivotably mounted on main bearing 24, is hinged to a front end of front tension rod 38 via a hinge point 50. A drive unit (not shown) accommodated in main bearing 24 drives coupling link 54 indirectly via a link unit or directly. The drive unit can be realized as an electric motor or as a hydraulic cylinder.

The two link assemblies 22 each comprise a main multi-joint linkage 56, which has two main links 58 and 60, of which main link 60 forms a main pillar, on which a side weatherstrip 62 is disposed, which interacts with a side window (not shown) of motor vehicle 10 when top 12 is in the closed position. Side weatherstrip 62 is composed of multiple parts and extends as far as into the area of front bow 26. The two main links 58 and 60 are pivotably mounted on main bearing 24 at one end and each hinged to middle roof link 48 at the other end so as to form the main multi-joint linkage. A coupling link 66, which serves to pivot a front link 68 relative to middle roof link 48 when top 12 is being displaced, is additionally hinged to main link 60 via an upper hinge point 64.

Top 12 comprises a headliner assembly 70, which forms an inner visible surface visible from vehicle interior 14 when top 12 is in the closed position. Headliner assembly 70 has a foldable headliner fabric 72, whose design can be adapted to the vehicle or according to customer request and which is indicated as a transparent gray surface for an area in FIG. 4. Additionally, headliner assembly 70 comprises a guide flap 74 on either side of the vertical longitudinal center plane of top 12, each guide flap 74 being pivotably mounted on main link 58 via a hinge 76. Guide flap 74 forms a contact surface 78, which is lined with headliner fabric 72 and has an outer edge 80, which is curved and follows the curve of and is in contact with side weatherstrip 62 when top 12 is in the closed position.

Figure 4:
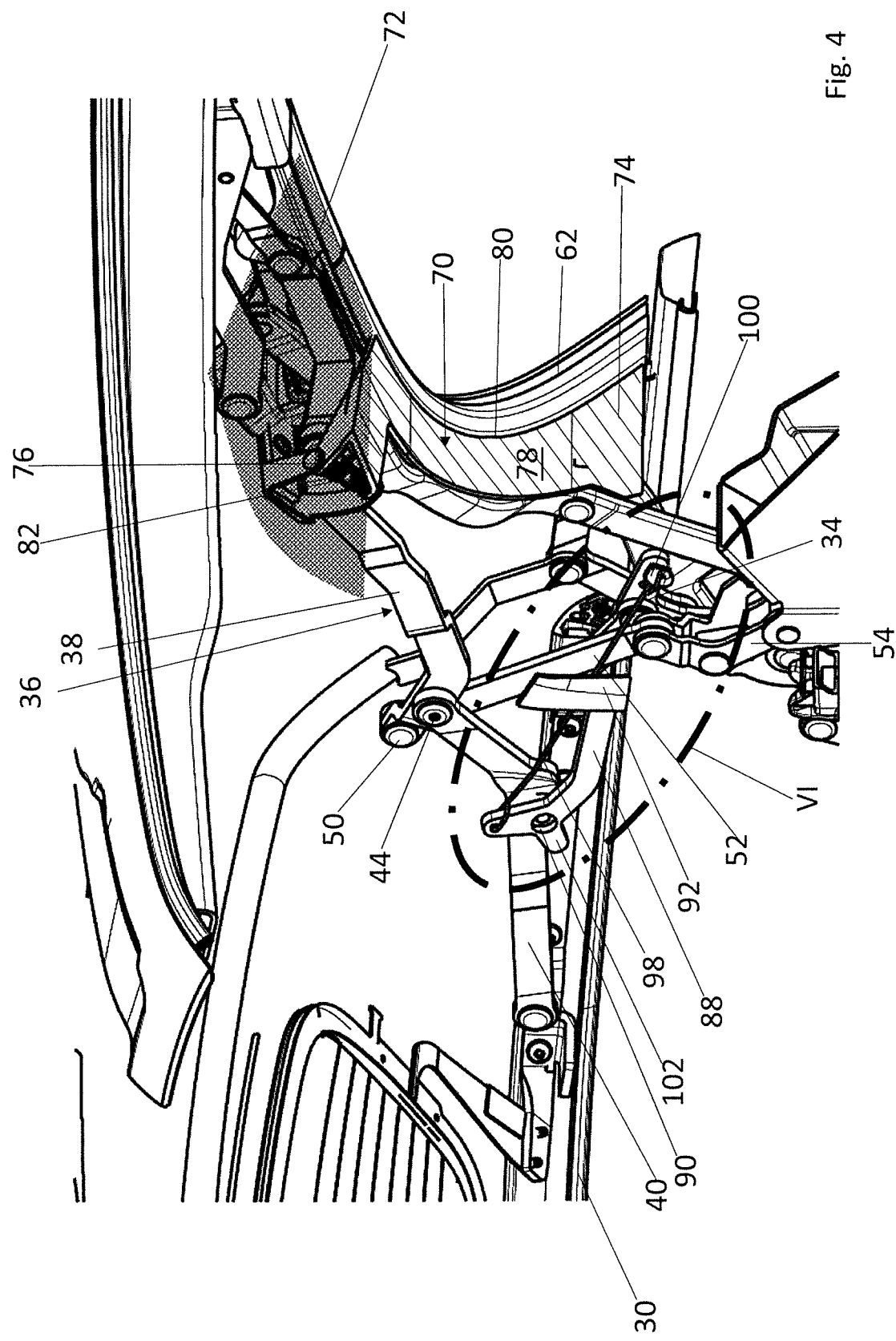
FIG. 4 is a perspective partial interior view of the top linkage in its closed position.

A torsion spring 82 pre-loads guide flap 74, which is pivotable about a pivoting axis formed by hinge 76, into an open position, in which guide flap 74 is pivoted inward and disposed on the side of main links 58 and 60 facing the vertical longitudinal center plane of top 12. For being pivoted into the cover position, which is illustrated in FIG. 4, a pull cable 84 is connected to guide flap 74, an end 86 of pull cable 84 facing away from guide flap 74 being attached to a deflection lever 49, which is disposed forward of middle roof link 48 when top 12 is in the closed position. When top 12 is in the closed position, pull cable 84 pulls guide flap 74 against the spring force of torsion spring 82 into the cover position, in which it covers main links 58 and 60 at its front side.

Headliner assembly 70 further comprises a guide link 88, which is pivotably mounted on rear tension rod 40 of tension rod assembly 36 via a pivot point 90. A front end of guide link 88 is provided with a contact plate 92, with which headliner fabric 72 is in contact and to which headliner fabric 72 is fixed. At an end facing away from contact plate 92, guide link 88 has a protrusion 94, which is provided with an eye 96, to which a pull cable 98 is attached, the end 100 of pull cable 98, which faces away from eye 96, being attached to lowering lever 34. Additionally, guide link 88 has a stop 102, which is formed as a protrusion and which is in contact with rear tension rod 40 from below when guide link 88 is in an end position, which is associated with the closed position of top 12.

When top 12 is being displaced into the closed position, a pulling force is exerted on guide link 88 by means of pull cable 98, causing guide link 88 to be moved into its end position, which is illustrated in FIG. 4. When top 12 is being displaced into the storage position, pull cable 98 is released, allowing contact plate 92 of guide link 88 to pivot upward, that is in the counterclockwise sense in FIG. 4.

Guide link 88 and its contact plate 92 keep headliner fabric 72 at a distance from respective link assembly 22 in the area of main bearing 24 and in the area of drive link 52 for tension rod assembly 36.

REFERENCE SIGNS 10 motor vehicle
12 top
14 vehicle interior
16 top storage space
18 top cover
20 top linkage
22 link assembly
24 main bearing
26 front bow
28 transverse bow
30 tension bow
32 rear window
34 lowering lever
36 tension rod assembly
38 front tension rod
40 rear tension rod
42 hinge point
44 hinge point
46 hinge point
48 middle roof link
49 deflection lever
50 hinge point
52 drive link
54 coupling link
56 main multi-joint linkage
58 main link
60 main link
62 side weatherstrip
64 hinge point
66 coupling link
68 front link
70 headliner assembly
72 headliner fabric
74 guide flap
76 hinge
78 contact surface
80 edge
82 torsion spring
84 pull cable
86 end
88 guide link
90 pivot point
92 contact plate
94 protrusion
96 eye
98 pull cable
100 end
102 stop

The invention claimed is:

1. A top for a convertible vehicle, the top comprising:
a foldable top cover and
a top linkage for deploying the top cover, the top linkage being displaceable between a closed position, in which a vehicle interior is covered, and a storage position, in which the vehicle interior is uncovered, and
the top linkage having a link assembly on either side of a vertical longitudinal center plane of the top, each link assembly being pivotably mounted on a vehicle-attached main bearing and comprising a tension rod assembly hinged to a tension bow which extends between the bilaterally disposed link assemblies and limits the top cover at its rear edge in the closed position, and
the top comprising a headliner assembly comprising a foldable headliner fabric and forming an inner visible surface of the top in the closed position,
wherein the headliner assembly comprises a guide link on either side of the vertical longitudinal center plane of the top, each guide link being hinged to the respective tension rod assembly, and the headliner fabric being in contact with each guide link, and
wherein the bilaterally disposed link assemblies each comprise a main multi-joint linkage having two main links and each guide link is hinged directly to the respective tension rod assembly.

2. The top according to claim 1, wherein the guide link comprises a contact plate with which the headliner fabric is in contact and to which the headliner fabric is in particular fixed.

3. The top according to claim 1, wherein the guide link is connected to an actuation means.

4. A top for a convertible vehicle, the top comprising: a foldable top cover and a top linkage for deploying the top cover, the top linkage being displaceable between a closed position, in which a vehicle interior is covered, and a storage position, in which the vehicle interior is uncovered, and the top linkage having a link assembly on either side of a vertical longitudinal center plane of the top, each link assembly being pivotably mounted on a vehicle-attached main bearing and comprising a tension rod assembly hinged to a tension bow which extends between the bilaterally disposed link assemblies and limits the top cover at its rear edge in the closed position, and the top comprising a headliner assembly comprising a foldable headliner fabric and forming an inner visible surface of the top in the closed position, wherein the headliner assembly comprises a guide link on either side of the vertical longitudinal center plane of the top, each guide link being hinged to the respective tension rod assembly, and the headliner fabric being in contact with each guide link, wherein the actuation means comprises a pull cable which is attached to the guide link on one side and to an adjusting link of the respective link assembly on the other side.

5. The top according to claim 4, wherein the adjusting link is a lowering lever for the tension bow.

6. The top according to claim 1, wherein the guide link interacts with a stop defining its pivoted position relative to the respective tension rod assembly when the top is in the closed position.

7. The top according to claim 1, wherein the main multi-joint linkage is pivotably mounted on the respective main bearing, a guide flap for the headliner fabric being pivotably mounted on the main multi-joint linkage.

8. The top according to claim 7, wherein the guide flap is provided with an actuating member.

9. A top for a convertible vehicle, the top comprising: a foldable top cover and a top linkage for deploying the top cover, the top linkage being displaceable between a closed position, in which a vehicle interior is covered, and a storage position, in which the vehicle interior is uncovered, and the top linkage having a link assembly on either side of a vertical longitudinal center plane of the top, each link assembly being pivotably mounted on a vehicle-attached main bearing and comprising a tension rod assembly hinged to a tension bow which extends between the bilaterally disposed link assemblies and limits the top cover at its rear edge in the closed position, and the top comprising a headliner assembly comprising a foldable headliner fabric and forming an inner visible surface of the top in the closed position, wherein the headliner assembly comprises a guide link on either side of the vertical longitudinal center plane of the top, each guide link being hinged to the respective tension rod assembly, and the headliner fabric being in contact with each guide link, wherein the top comprises an adjusting spring which pre-loads the guide flap in a direction of an end position and against whose spring force the actuating member pivots the guide flap.

10. The top according to claim 7, wherein the guide flap has an edge which, when the top is in the closed position, follows a curve of a side weatherstrip laterally limiting the top cover.

11. A convertible vehicle comprising a top according to claim 1.

12. The top according to claim 8, wherein the actuating member comprises a pull cable.

13. The top according to claim 10, wherein the edge is disposed on one of the main links.

* * * * *